United States Patent Office 2,900,424
Patented Aug. 18, 1959

---

2,900,424

METHOD FOR PRODUCING ISOTOPIC METHANES AND PARTIALLY HALOGENATED DERIVATIVES THEREOF

Jack W. Frazer, Livermore, Calif., assignor to the United States of America as represented by the United States Atomic Energy Commission No Drawing. Application April 10, 1958
Serial No. 727,756

19 Claims. (Cl. 260—658)

This invention relates to a process for producing methanes and partially halogenated derivatives thereof, and specifically to such a process employing a reaction between lithium hydride and a halogenated methane or mixtures of halogenated methanes and free halogens. Since isotopes of hydrogen and carbon can be easily incorporated into the initial reactants, the process is particularly amenable to the production of isotopic methane and halogenated derivatives thereof, i.e., methane and halogenated derivatives thereof containing isotopes of hydrogen and/or carbon.

Methane is a ubiquitous material which is produced and consumed in countless industrial operations and enters into a multitude of biological and chemical reactions. Chemically pure methane is difficult to prepare. Furthermore, isotopes of hydrogen and carbon cannot be introduced easily into methane itself and processes for the production of isotopic methanes from other materials generally involve purification difficulties. For example, deuterated water is commonly reacted with aluminum carbide to produce deuterated methanes with the consequent difficulty in separating the water, methane and gaseous reaction products. Likewise, isotopic halogenated derivatives of methane present similar or even greater difficulties of preparation and purification.

A method of producing isotopic methanes and/or partially halogenated derivatives thereof has now been discovered which comprises reacting together lithium hydride, deuteride or tritide with a halogenated methane or with a halogenated methane in combination with free halogen. The process is conveniently carried out by passing a halogenated methane preferably at low pressures or in an admixture with an inert gas through a fixed heated bed of the lithium hydride from which all air has been excluded. The reaction temperatures vary for the various halogenated methanes from less than 100° C. to about 200° C. Reaction rates are relatively slow. The products are evolved as gases and may be separated from concurrently produced hydrogen by condensation or other conventional procedures. Presence in the product of a partially halogenated methane, in addition to methane, is dependent mainly upon reaction conditions which determine completion of the reaction; however, when a free halogen is included in the reaction mixture a partially halogenated methane is always produced. Isotopic methanes and partially halogenated methanes are produced when the corresponding isotopes are initially present in the reactants.

Both methane and halogenated methanes have well-known and varied uses. When isotopes are introduced into the molecules, as by the present process, particularly carbon-14 deuterium and tritium, the resultant molecule is thereby labeled and may be employed as tracers in numerous processes and organic reactions which are of commercial importance and which may be most conveniently studied by tracing the labeled compound through the various operations or reactions. A further specific use of isotopic halogenated methanes is in the synthesis of organic tracer compounds of higher molecular weight by well-known methods. When thusly labeled with deuterium or tritium the methanes may represent considerable investments and even small quantities may be extremely valuable. A few milliliters in volume suffice for most tracer experiments.

Accordingly, an object of the invention is to provide a method for the production of methane.

A further object of the invention is to provide a process for the production of methane comprising passing a gaseous material over a heated bed of solid lithium hydride wherein few or no gaseous impurities are concurrently produced.

Another object of this invention is to provide a process for the production of isotopic methanes and partially halogenated methanes, particularly those labeled with the isotopes carbon-14, deuterium and tritium.

A specific object is to provide a process for the production of isotopic methanes and partially halogenated derivatives thereof by reacting isotopic lithium hydride with a halogenated methane or a halogenated methane in admixture with a halogen.

The invention will be better understood upon consideration of the following description and examples.

In operating the process of the invention, apparatus including a closed reaction chamber equipped with high temperature heating means and a gas collection system is employed. Ordinarily the chamber, conduits and reservoir of the gas collection system are evacuated to eliminate air or the air may be displaced by an inert gas or hydrogen gas of similar isotopic composition to that of the lithium hydride employed.

The reactants, lithium hydride and a completely halogenated methane, may be prepared by a number of well-known processes and natural isotopic mixtures are available either through regular commercial channels or may be produced from commercially available materials. If an isotopic methane is to be prepared the completely halogenated methane in which the carbon component is enriched in $C^{12}$, $C^{13}$ or $C^{14}$ and/or lithium hydride in which the hydrogen component is protonic hydrogen, deuterium, tritium or any desired mixture thereof, is employed. The lithium hydride is employed in a finely divided dry powder form, while the halogenated methane is reacted therewith by contact in the gaseous state, preferably at low pressures or in admixture with an inert gas as hereinafter specified. Impurities ordinarily found in the isotopic lithium hydride, i.e., lithium hydroxide, oxide, nitrate, etc., and lithium metal as well as impurities ordinarily found in chemical grade halogenated methanes have surprisingly little effect upon the reaction; however, removal of such impurities from source materials eliminates the necessity of separation of various derivative impurities from the reaction products. The halogenated methane may contain a single halogen elemental constituent, e.g., as in $CF_4$, $CCl_4$ or $CBr_4$, or may contain several different halogens, e.g., as in $CBr_2Cl_2$ or $CF_3Br$. Completely halogenated methane is preferred since all of the hydrogen will then be labeled; however, partially halogenated methanes react to produce corresponding products, which include the introduced hydrogen isotopes in addition to the original hydrogen. Similarly, any elemental halogen is suitable for use in the indicated mixtures.

More specifically, in the practice of the invention a quantity of lithium hydride, deuteride, tritide or mixture thereof of reasonably high purity and small mesh size is disposed loosely in a vessel or tube provided with controlled heating means through which a gas can be passed to contact said hydride. Most conveniently, for liter amounts, the hydride may be disposed in a resistance wire wrapped glass tube between wads of Fiberglas packed to prevent dust transport. The lithium hydride particle size should be fine enough to permit optimum surface contact without obstruction to gas flow, e.g., 40 to 200 mesh has been found satisfactory. The container containing the lithium hydride is evacuated and the lithium hydride is cured or purged of the hydroxide by heating to an elevated temperature, i.e., 400° C., for one-half hour or more. This step is necessary because of the affinity of the hydride for water, the presence of which interferes with the reaction. Curing is obviously not necessary where a water-free product is employed.

At the conclusion of the initial heating the temperature of the hydride is lowered to the reaction temperature of the particular methane synthesis to be undertaken, generally between about 100° and 200° C., or the reaction may be carried out at a higher temperature. The selected halogenated methane is then passed through the tube to contact the hydride. The operation is preferably accomplished by passing either the halogenated methane alone or an inert gas, e.g., argon or helium, saturated with the halogenated methane through the bed containing the lithium hydride. In either instance the total or partial pressure of the halogenated methane is generally held to only a few mm. Hg. The halogenated methane alone may be vaporized by evaporating the refrigerated liquid or solid under vacuum conditions. Alternatively, the halogenated methane may be added to the inert gas by bubbling the inert gas through an amount of the former while in the liquid or solid phase. By controlling the temperature of the liquid the amount of the halogenated methane which will be admixed with the inert gas is controlled, e.g., the liquid temperature of $CBr_2F_2$ was maintained at $-78°$ C. to produce a gaseous mixture with an inert gas at atmospheric pressure containing about 0.2% halogenated methane. Where a free halogen is also added as a reactant, the gas is additionally bubbled through liquid halogen, e.g., Br, or mixed with gaseous halogen, e.g., $Cl_2$, in similar proportions. Other means of adding the reactant gases to the inert gas may be used. All of the aforementioned amounts and pressures are determined by convenience and are not in any way known to be critical. In general reaction rates are very low, of the order of a few milliliters per hour, under the conditions specified.

Upon contact of the lithium hydride in the enclosed heated bed with the halogenated methane, or halogenated methane to which a free halogen has been added, hydrogen, methane and usually a variable amount of partially halogenated methanes, are produced. Temperatures are not critical; generally heat input is merely regulated to a point where product evolution proceeds at a satisfactory rate without reference to the temperature at which the reaction commences, e.g., 200° C. or slightly higher. The exact nature of the reaction mechanism has not been determined, but the lithium hydride appears to retain its granular form throughout the reaction. Whether a partially halogenated methane different from the reactants, e.g., $CH_3Br$, $CH_2Cl_2$, etc., is produced, as well as the methane, is apparently dependent upon the reaction conditions. Partially halogenated methanes are always produced when a free halogen gas is employed in the reaction, with the halogen always being introduced into the methane molecule. Separation of the products may be easily accomplished by condensation of the methane and halogenated methanes in a liquid nitrogen cold trap of large surface area and pumping off of the hydrogen, or the condensed products may be withdrawn as a liquid and separated by fractionation in a multiple plate distillation column. The residual hydrogen can of course be reconverted into lithium hydride and recycled.

Further details of the process will become apparent upon consideration of the following examples.

Example I

An experiment was undertaken to produce methane, in admixture with partially halogenated methanes, by reacting lithium hydride with carbon tetrachloride. In an externally heated 4 x 1½ inch Pyrex reaction tube connected to a gas evacuating and collection system was disposed approximately 10 grams of lithium hydride under an inert atmosphere. The LiH was in the form of particles, 40 to 200 mesh, about 95% pure, the impurities consisting of both the hydroxide and the oxide, as well as trace amounts of lithium carbonate, lithium nitride and free lithium metal. The tube was evacuated and the LiH purged or cured of hydroxide by heating at 400° C. for about one-half hour. The temperature was then allowed to drop to 175° C. and chemically pure carbon tetrachloride was passed through the tube at about 0.3 mm. pressure to contact the LiH particles. Gaseous products were drawn off through diffusion and Toepler pumps arranged in tandem and were then collected in a gas buret. In a 40 minute run about 1½ ml. of methane was collected. Analysis of the total gaseous product with a mass spectroscope showed 11.7% methane and 85% hydrogen. In a second similar experiment the $CCl_4$ was evaporated under vacuum conditions at 45° C. and passed through a bed at 225° C. Mostly $H_2$ with some $CH_4$ and 3% $CH_3Cl$ were produced.

Example II

The experiment of Example I was repeated using carbon tetrabromide instead of carbon tetrachloride in an attempt to produce partially halogenated methanes. Bed temperature was 53–98° C. A quantitative spectrographic analysis of the product showed methane and 0.7% bromomethane, $CH_3Br$.

Example III

The experiment of Example I was repeated using carbon dibromide-dichloride instead of carbon tetrachloride in an attempt to produce partially halogenated methanes. Bed temperature was 100° C. Reaction time was of the order of 4–6 minutes; operation was thereafter stopped because of an air leak, causing the products to become diluted, and making the following spectrographic analysis only approximate: $CH_3Br$, 4%; $CH_3Cl$, 5%; $H_2$, 65%. The experiment was repeated in which the $CBr_2Cl_2$ was evaporated at 24° C. under vacuum conditions and the bed temperature was maintained at 190° C. In 3 minutes 6.75 ml. of product was collected which upon mass spectroscopic analysis showed 2.4% $CH_4$, 0.74% $CH_3B_4$, 0.69% $CHCl_3$, 0.11% $CH_2Br_2$, 0.29% $CH_2Cl_2$, 0.24% $CH_3Cl$, 14.61% CO and 80.38% $H_2$.

Example IV

The experiment of Example I was repeated using $CF_3Br$ in the place of $CCl_4$ in order to determine whether methane could be produced using a fluorine based halogenated methane. Analysis of gaseous material from a run of a few minutes showed the presence of methane, $CH_4$.

Example V

The experiment of Example I was repeated using carbon difluoride-dibromide evaporated into atmospheric helium at 20° C. The mixture of gases was passed through the bed at the rate of 50–60 ml./min. and the bed temperature was 110° C. Infra-red analysis showed appreciable quantities of $CHF_3$, along with $C_2H_4$, $CH_2F_2$, $CHF_2Br$, $CH_4$ and $C_2F_2$.

Example VI

The experiment of Example I was repeated using carbon tetrachloride and bromine in the place of carbon tetrachloride alone. The gaseous reaction mixture was contained from bromine evaporated from frozen bromine at about 1 mm. vapor pressure, and $CCl_4$ similarly evaporated from frozen $CCl_4$ at about 2.5 mm. vapor pressure.

The lithium hydride bed had been used previously and contained some chlorides from a previous run. Bed temperature was 98° C. About 10 ml. gaseous product was collected. Spectrographic analysis showed $CH_3Br$, 4.4%; $CH_4$, 0.5%; $CH_2Br_2$, 0.15%; $CH_3Cl$, 0.5%; $H_2$, 73.7%.

*Example VII*

The experiment of Example I was repeated using carbon tetrachloride and chlorine instead of carbon tetrachloride alone. The $CCl_4$ was evaporated from a reservoir maintained at −63° C. and the $Cl_2$ from a reservoir maintained at −119° C. Bed temperature was 225° C. Analysis showed 2.2% $CH_4$, 19% $CO_2$, 76% $H_2$, 1.5% $CH_3Cl$, 0.2% $CH_2Cl_2$ and traces of $CHCl_3$.

*Example VIII*

The experiment of Example I was repeated using carbon tetrabromide and bromine instead of carbon tetrachloride alone. The $CBr_4$ was evaporated at 24° C. and the bromine was evaporated at −63° C. Bed temperature was 98° C. Analysis showed 73.7% $H_2$, 0.15% $CH_2Br_2$, 0.5% $CH_4$ and 4.4% $CH_3Br$.

While the invention has been disclosed with respect to several preferred embodiments, it will be apparent to those skilled in the art that numerous variations and modifications may be made within the spirit and scope of the invention and thus it is not intended to limit the invention except as defined in the following claims.

What is claimed is:

1. In a process for producing a material selected from the group consisting of methane and partially halogenated methanes, the step comprising reacting lithium hydride with a gaseous material selected from the group consisting of a halogenated methane and a halogenated methane admixed with free halogen to yield a reaction mixture containing said material.

2. In a process for producing isotopic methane and isotopic partially halogenated methanes, the steps comprising heating a bed of finely divided lithium hydride, contacting a gaseous material selected from the group consisting of a halogenated methane and a halogenated methane admixed with free halogen with said heated lithium hydride, the carbon isotope in said halogenated methane being selected from the group consisting of $C^{12}$, $C^{13}$, $C^{14}$ and mixtures thereof, and the hydrogen isotope in said lithium hydride being selected from the group consisting of protonic hydrogen, deuterium and tritium and mixtures thereof.

3. The process of claim 2 in which said carbon isotope consists of a mixture of carbon-12 and carbon-13.

4. The process of claim 2 in which said carbon isotope consists of carbon-14.

5. The process of claim 2 in which said hydrogen isotope consists of protonic hydrogen.

6. The process of claim 2 in which said hydrogen isotope consists of deuterium.

7. The process of claim 2 in which said hydrogen isotope consists of tritium.

8. In a process for producing isotopic methane and isotopic partially halogenated methanes, the steps comprising contacting finely divided lithium hydride heated to an elevated temperature with a gaseous mixture of an inert gas and a material selected from the group consisting of a halogenated methane and a halogenated methane admixed with free halogen to produce a reaction mixture containing methane and gaseous reaction products, collecting the reaction product mixture, and separating the methane and halogenated methanes from the reaction mixture.

9. The process of claim 8 in which the temperature of the bed is in the range of 50° to 250° C.

10. The process of claim 8 in which the pressure of the gaseous mixture passing through said bed is less than 10 mm. Hg.

11. The process of claim 8 in which said finely divided lithium hydride has a mesh size between 40 and 200.

12. The process of claim 8 in which said reaction products are separated from said gaseous mixture by condensation and fractional distillation.

13. The process of claim 8 in which said gaseous component is a halogenated methane.

14. The process of claim 8 in which said gaseous component is a halogenated methane to which a free halogen has been added.

15. In a process for producing isotopic methanes and isotopic partially halogenated methanes, the steps comprising disposing 40–200 mesh lithium hydride of which the hydrogen is selected from the group consisting of protonic hydrogen, deuterium, and tritium and mixtures thereof as a bed in a reaction chamber, evacuating said chamber, heating said lithium hydride to a temperature within the range of 50° to 250° C., contacting said lithium hydride at a pressure below 10 mm. Hg with a gaseous mixture of an inert gas and a material selected from the group consisting of a halogenated methane and a halogenated methane admixed with free halogen gas, said carbon isotope in said halogenated methane being selected from the group consisting of $C^{12}$, $C^{13}$, $C^{14}$ and mixtures thereof, to yield a gaseous reaction mixture including methanes, collecting said reaction mixture, and separating methanes from the reaction mixture by condensation and fractional distillation.

16. The process of claim 15 in which carbon tetrachloride alone is used as the gaseous component mixed with said inert gas.

17. The process of claim 15 in which carbon tetrabromide alone is used as the gaseous component mixed with inert gas.

18. The process of claim 15 in which carbon dibromide-dichloride alone is used as the gaseous component mixed with said inert gas.

19. The process of claim 15 in which carbon tetrachloride and bromine are used as the gaseous component mixed with said inert gas.

References Cited in the file of this patent

UNITED STATES PATENTS

| | | |
|---|---|---|
| 2,406,195 | Cass | Aug. 20, 1946 |
| 2,553,518 | Lake et al. | May 15, 1951 |
| 2,829,180 | Montgomery et al. | Apr. 1, 1958 |

OTHER REFERENCES

Gaylord: "Reduction with Complex Metal Hydrides," Interscience Publishers Inc., New York (1956), p. 910 relied on.